US010889723B2

(12) United States Patent
Matzdorf et al.

(10) Patent No.: US 10,889,723 B2
(45) Date of Patent: Jan. 12, 2021

(54) SYNERGISTIC CORROSION INHIBITOR COMPOSITIONS

(71) Applicants: Craig Matzdorf, Hollywood, MD (US); Frank Pepe, California, MD (US); Michael Brindza, Leonardtown, MD (US)

(72) Inventors: Craig Matzdorf, Hollywood, MD (US); Frank Pepe, California, MD (US); Michael Brindza, Leonardtown, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 149 days.

(21) Appl. No.: 16/184,264

(22) Filed: Nov. 8, 2018

(65) Prior Publication Data
US 2020/0148893 A1 May 14, 2020

(51) Int. Cl.
| C09D 5/08 | (2006.01) |
| C09D 175/04 | (2006.01) |
| C09D 163/00 | (2006.01) |
| C09D 7/61 | (2018.01) |
| C08K 3/32 | (2006.01) |
| C08K 5/098 | (2006.01) |
| C09D 7/63 | (2018.01) |
| C23F 11/12 | (2006.01) |
| C23F 11/18 | (2006.01) |

(52) U.S. Cl.
CPC .............. C09D 5/084 (2013.01); C08K 3/32 (2013.01); C08K 5/098 (2013.01); C09D 5/086 (2013.01); C09D 7/61 (2018.01); C09D 7/63 (2018.01); C09D 163/00 (2013.01); C09D 175/04 (2013.01); C08K 2003/324 (2013.01); C23F 11/126 (2013.01); C23F 11/184 (2013.01)

(58) Field of Classification Search
CPC .......... C09D 5/084; C09D 5/086; C09D 7/61; C09D 7/63; C09D 175/04; C09D 163/00; C08K 3/32; C08K 5/098; C08K 2003/324; C23F 11/126; C23F 11/184
See application file for complete search history.

(56) References Cited

U.S. PATENT DOCUMENTS

| 3,099,521 A | 7/1963 | Arensberg |
| 3,304,267 A | 2/1967 | Miller |
| 5,212,261 A | 5/1993 | Stierman |
| 5,948,147 A | 9/1999 | Sinko |
| 9,139,913 B2* | 9/2015 | Matsui .................... C23C 26/00 |
| 2012/0025142 A1 | 2/2012 | Visser et al. |
| 2014/0070136 A1 | 3/2014 | Yang et al. |
| 2016/0177104 A1 | 6/2016 | Fujita et al. |
| 2018/0162099 A1* | 6/2018 | Furar ...................... C08L 75/04 |
| 2018/0282555 A1 | 10/2018 | Matzdorf et al. |

FOREIGN PATENT DOCUMENTS

WO PCT/US19/12590 4/2019

OTHER PUBLICATIONS

MIL-PRF-23377K, Primer Coatings: Epoxy, High-Solids, Jun. 7, 2012.
ML-PRF-85582E, Primer Coatings: Epoxy, Waterborne, Oct. 16, 2012.
TT-P-2760A, Prmer Coating: Polyurethane, Elastomeric, High-Solids, Dec. 30, 1994.

* cited by examiner

Primary Examiner — Anthony J Green
(74) Attorney, Agent, or Firm — Mark O. Glut; NAWCAD

(57) ABSTRACT

The invention comprises synergistic compositions of at least one metal polycarboxylate and lithium phosphate. The synergistic compositions are designed to be added to film-forming or other compositions to reduce the corrosion of various metal surfaces or substrates on which the synergistic compositions are applied.

13 Claims, 9 Drawing Sheets

Figure 1. Zinc citrate - Commercial

Figure 2. Zinc Oxalate (Commercial)

Figure 3. Lithium Phosphate

Figure 4. Zinc Oxalate: Zinc Citrate: Lithium Phosphate

Figure 7.
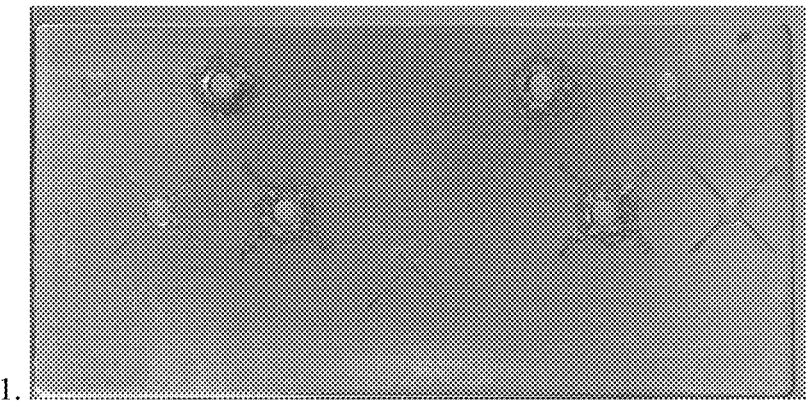
1.
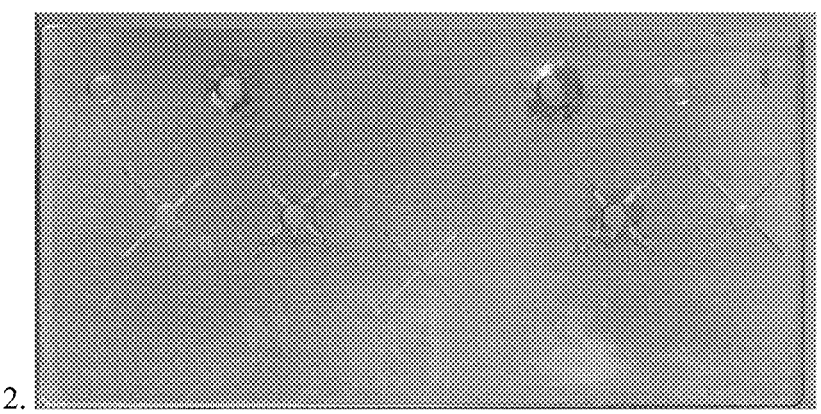
2.
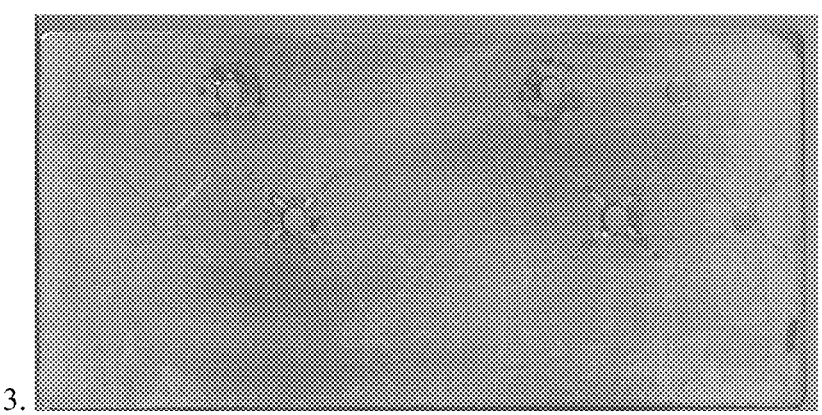
3.

Figure 8. Water solubility of selected compounds

| Chemical Solubility g/1000mL @ 20C unless noted | | | | | Cation | | | | | |
|---|---|---|---|---|---|---|---|---|---|---|
| Anion | Zn | Mg | Ca | Mn | Sr | Ba | Ce | Pt | Y | Li |
| Citrate | Insol in water | Sol in water @ 298K monohydrate 0.0452 / tetradecahydrate c 0.0486 | 0.08496 @ 18 & 0.0959 @ 25 | | | 0.0406g @ 18 & 0.0572g @ 25 | 0.3 | | | 61.2 @ 15 |
| Oxalate | 6.4x10^-4 @ 18 & 7.15x10^-4 @ 26 | 0.03 @ 18 | 6.8x10^-4 | Slightly Sol in water | 0.00461 @ 18 | 0.0022 | 4.1x10^-5 @ 25 | 7.4x10^-5 @ 25 | 0.0001g @ 25 | Sol in 15 parts water |
| Nitrate | 118.3 | 69.5 | 129.3 | 57.33 @ 18 & 62.37 @ 25 | 70.5 | 9.2 | | | | 53.9 @ 25 |
| Succinate | | 24.3% @ 15 & 66.3% @ 100 | 1.27% | | 0.370 | 0.418 | | | | |
| Tartrate | 0.022g & 0.041 @ 85 | | 0.0475 | | 0.200 | 0.0279 | 0.005 @ 25 | | | 0.079 @ 0 |
| Carbonate | 0.0206 @ 25 | 26 w/ CO2 saturation in water | 0.0065 | 0.0065 @ 25 | 1.09 x10^-3 @ 24 | 0.0022 | Almost Insol in Water | | Insol in water | 1.33 |
| Chloride | 432g/100g @ 25 & 614g/100g @ 100 | 54.5 | 74.5 | 73.9 | 52.9 | 35.7 | 3 | 50.86 @ 13 | Sol in water. | 78.5 |
| Benzoate | 2.49 @ 17 & 2.41 @ 27.8 | 6.16 @ 15 & 19.6 @ 100 | 3.02 @ 26 | | 5.4 @ 24.7 | 4.3g @ 15 & 10.1g @ 100 | | | | 40 @ 100 |
| Malate | | | 0.9214 @ 18 & 0.8352 @ 25 | | 0.448 | 0.883 | | | | |

Figure 9. Solubility products for selected compounds

| Chemical Solubility $k_{sp}$ @ 25C unless noted | Cations | | | | | | | | | |
|---|---|---|---|---|---|---|---|---|---|---|
| Anion | Zn | Mg | Ca | Mn | Sr | Ba | Ce | Pr | Y | Li |
| Citrate | | | | | | | | | | |
| Oxalate | 1.38x10^-9 (dihydrate) | 4.83x10^-6 (dihydrate) | 2.32x10^-9 (mono hydrate) | 1.70x10^-7 (dihydrate) | | | | | | |
| Nitrate | | | | | | | | | | |
| Succinate | | | | | | | | | | |
| Tartrate | | | | | | | | | | |
| Carbonate | 1.46x10^-10 (anhydrous) 5.42x10^-11 (mono) | 2.38x10^-6 (trihydrate) 6.82x10^-6 | 3.36x10^-9 (Calcite) | 2.24x10^-11 | 5.60x10^-10 | 2.58x10^-9 | | | 1.03x10^-31 | 8.15x10^-4 |
| Chloride | | | | | | | | | | |
| Benzoate | | | | | | | | | | |

Figure 10. Cathodic current density (Amps per square centimeter) at Ecorr for various inhibitors on 2024-T3 aluminum in 3.5% salt water.

| Inhibitor | Current density at Ecorr (A/cm2) | Relative reduction in current density |
|---|---|---|
| None | $3 \times 10^{-6}$ | 1.00 |
| Zinc citrate | $7 \times 10^{-6}$ | 0.43 |
| Zinc oxalate | $9 \times 10^{-7}$ | 3.33 |
| Lithium phosphate | $4 \times 10^{-6}$ | 0.75 |
| Zinc citrate, zinc oxalate and lithium phosphate | $6 \times 10^{-8}$ | 50.00 |
| Strontium chromate | $2 \times 10^{-8}$ | 150.00 |

US 10,889,723 B2

SYNERGISTIC CORROSION INHIBITOR COMPOSITIONS

ORIGIN OF INVENTION

The invention described herein was made by employee(s) of the United States Government and may be manufactured and used by or for the Government for governmental purposes without the payment of any royalties thereon or therefor.

FIELD OF THE INVENTION

The invention constitutes synergistic compositions of corrosion inhibitors based on lithium phosphate and polycarboxylate anions complexed with a variety of cations. The inhibitors can be designed to be used for different applications, including being added to film forming or other compositions to reduce the corrosion of the metal substrate on which the compositions are applied. Individual polycarboxylate compounds show corrosion inhibition for selected metals like steel or aluminum, in certain accelerated corrosion tests, but, none are effective for multiple metals or in multiple accelerated corrosion tests. Follow-up research also showed that combinations of lithium phosphate with one or more metal polycarboxylate compounds provided even better synergistic corrosion inhibition that would not be predicted by the performance of the individual compounds.

The novel feature of this invention is the combination of lithium phosphate with one or more polycarboxylate salts, with the same or varying cations, to provide superior corrosion resistance compared to individual compounds or combinations without lithium phosphate. In addition, the corrosion resistance of coatings using active aluminum alloy pigments is enhanced by these compounds. Prior art demonstrates corrosion inhibition by phosphate compounds and mono- and polycarboxylate compounds as additives to protective coatings but their performance is limited. None of the prior art predicts the synergistic effects disclosed herein.

BACKGROUND OF THE INVENTION

Compounds based on hexavalent chromium, like zinc chromate, barium chromate and strontium chromate, are superior corrosion inhibitors and have been used for years to protect aircraft and other valuable assets which would otherwise corrode more quickly in the environment. Protective primers used in naval aviation, according to the materials specifications MIL-PRF-23377, MIL-PRF-85582, and TT-P-2760, describe and qualify coatings based on chromate inhibitors. Although chromate-based inhibitors are technically excellent, the hexavalent chromium species is a known carcinogen and has been targeted for replacement since at least the early 1970's. Corrosion inhibitors based on non-chromate compounds have been developed and implemented but are to date less effective for protecting steel and aluminum. A high-quality non-chromate inhibitor system is described by U.S. Pat. No. 5,948,147.

Another way to protect metal substrates is to include sacrificial metal pigments like zinc, magnesium and active aluminum alloys in coatings in sufficient amounts so the metal particles corrode preferentially instead of the metal surface which they contact. These coatings can be good at protecting steel and aluminum but rely on the metal pigment to provide electrochemical protection of the metal substrate. There is potential to improve their performance by combining traditional chemical corrosion inhibitors with the metal pigments. To be most effective, the inhibitors should not interfere with the electrochemical action of the metal pigment.

SUMMARY OF INVENTION

This invention comprises synergistic compositions of corrosion inhibitors based on polycarboxylic acids and a variety of different cations. The inhibitors are designed to be added to film-forming or other compositions to reduce the corrosion of the metal on which the materials are applied. Individual polycarboxylate compounds show corrosion inhibition for selected metals like steel or aluminum, in certain accelerated corrosion tests, but none are effective for multiple metals or in multiple accelerated corrosion tests. It was discovered that specific combinations of lithium phosphate and polycarboxylic metal salts provided synergistic corrosion inhibition that would not be predicted by the performance of the individual compounds. A novel feature of this invention is the combination of lithium phosphate with metal polycarboxylate compounds to provide superior corrosion resistance compared to the individual compounds.

BRIEF DESCRIPTION OF DRAWINGS

FIG. 1: Potentio-dynamic scans of zinc citrate in 3.5% salt water solution showing its ability to inhibit corrosion on aluminum and steel. The dotted line is the aluminum control with no zinc citrate and the smooth line is the aluminum with zinc citrate in solution.

FIG. 2: Potentio-dynamic scans of zinc oxalate in 3.5% salt water solution showing its ability to inhibit corrosion on aluminum and steel. The dotted line is the aluminum control with no zinc oxalate and the smooth line is the aluminum with zinc oxalate in solution.

FIG. 3: Potentio-dynamic scans of lithium phosphate in 3.5% salt water solution showing its ability to inhibit corrosion on aluminum and steel. The dotted line is the aluminum control with no lithium phosphate and the smooth line is the aluminum with lithium phosphate in solution.

FIG. 4: Potentio-dynamic scans of zinc citrate, zinc oxalate, and lithium phosphate in 3.5% salt water solution showing their synergistic ability to inhibit corrosion on aluminum and steel. The dotted line is the aluminum control with no inhibitors and the smooth line is the aluminum with the zinc citrate, zinc oxalate, and lithium phosphate in solution.

Figure 1:
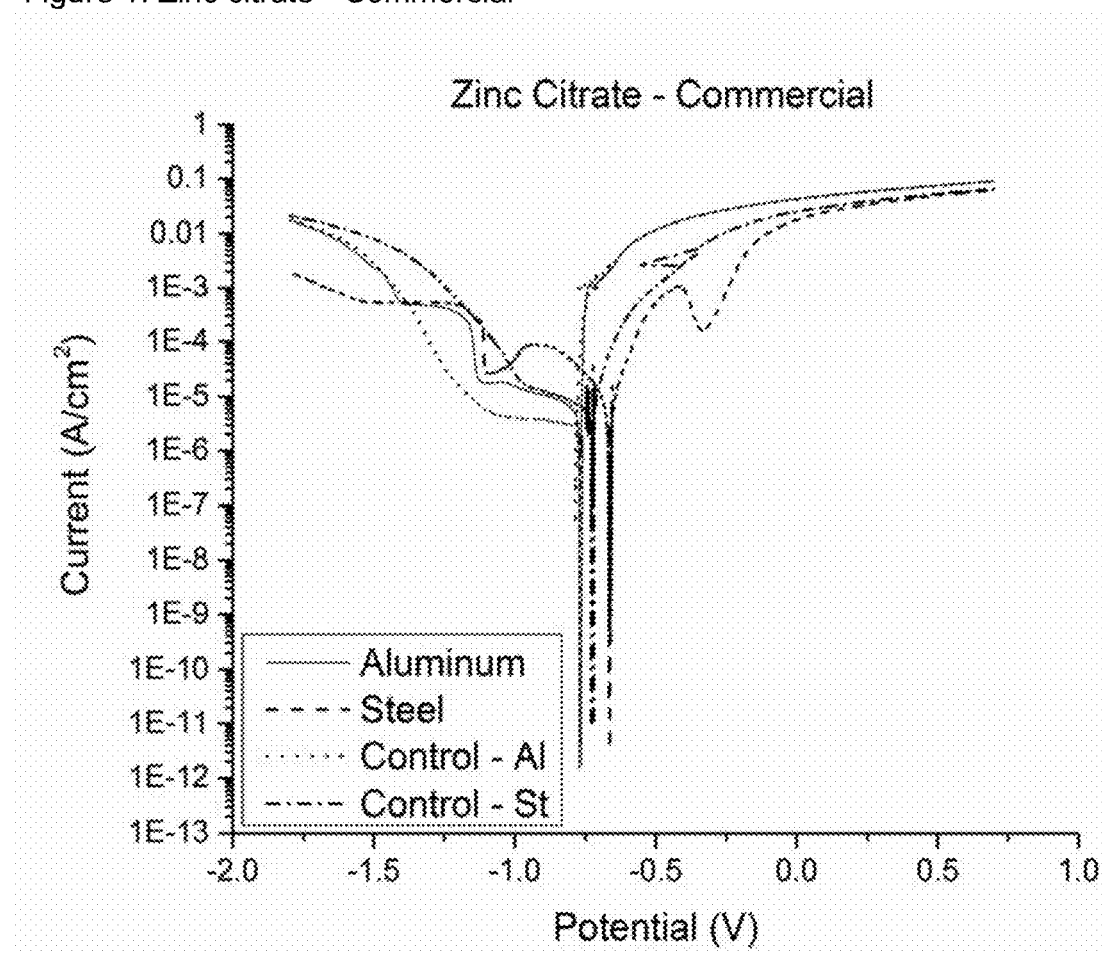
FIGS. 1 through 4 show the results of potentio-dynamic scans of these solutions. In the scans, the voltage is slowly raised over time and the current (output) is measured. In these assessments, the lower the current is, the more effective the inhibitor(s). It is clear that the combination of lithium phosphate with zinc citrate and zinc oxalate is superior to the individual compounds. In the figures, compare the aluminum control (dashed) curve to the smooth curves, which include the inhibitor(s).
Figure 2:
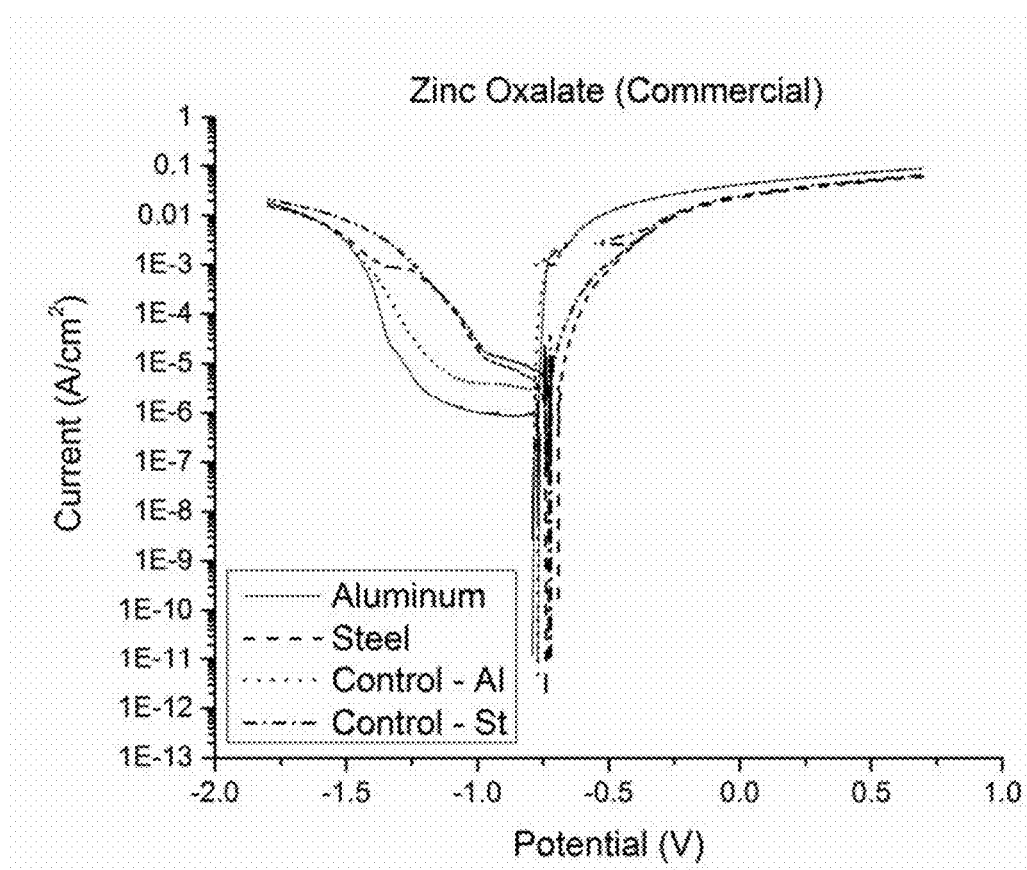
Figure 3:
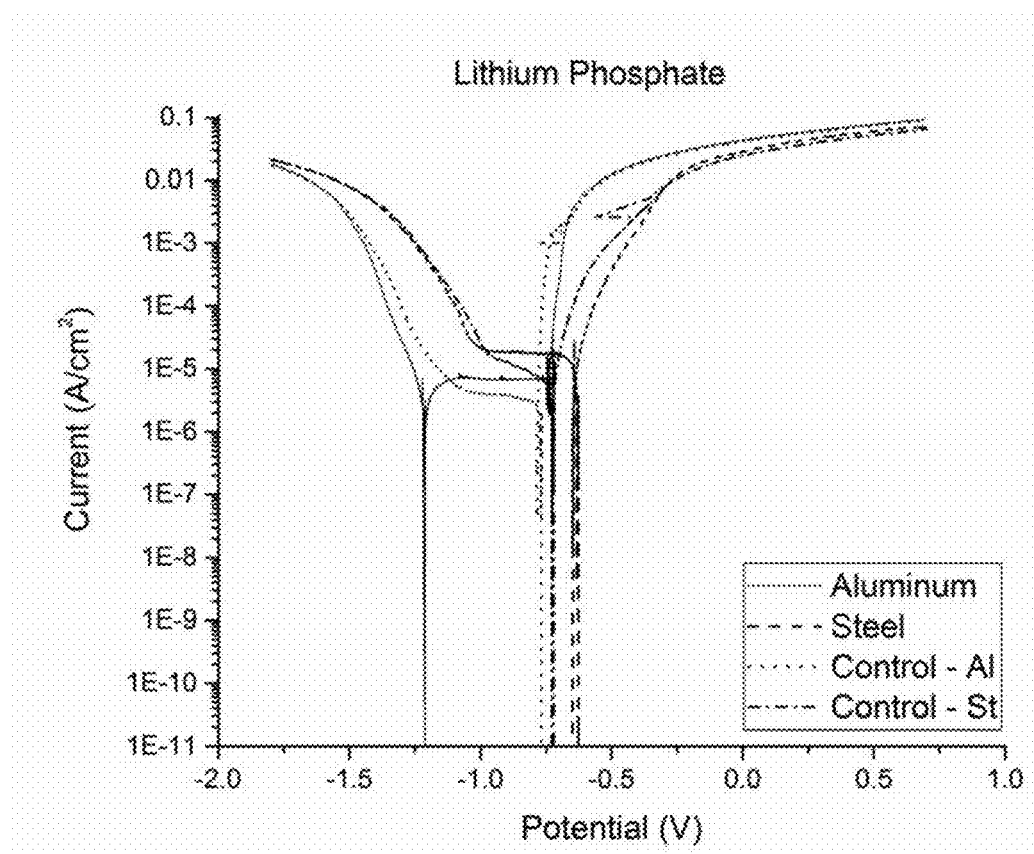
Figure 4:
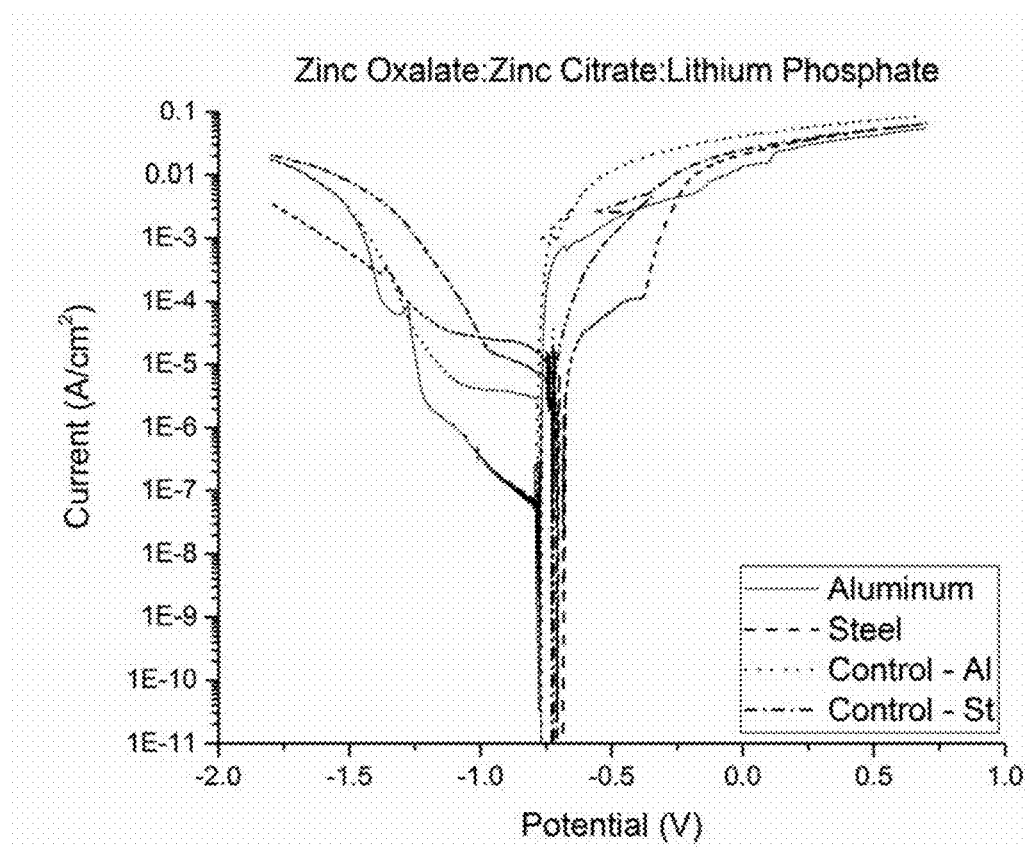

FIG. 7. Performance of aluminum-rich primer with and without inhibitors on galvanic corrosion test panels. Panel 1 is the aluminum-rich primer control, panel 2 is aluminum-rich primer with zinc oxalate and magnesium oxalate, and panel 3 is aluminum-rich primer with zinc oxalate, magnesium oxalate and lithium phosphate.

FIG. 8. Water solubility of selected compounds.

FIG. 9. Solubility products for selected compounds.

FIG. 10. Cathodic current density (Amps per square centimeter) at Ecorr for various inhibitors on 2024-T3 aluminum in 3.5% salt water.

DESCRIPTION OF INVENTION

The subject invention is a synergistic blend of inhibitors, consisting of lithium phosphate and at least one inhibitor chosen from the following:
Anions: polycarboxylates chosen from linear and branched aliphatic molecules like oxalate, citrate, tartrate, succinate, and adipate, and aromatic molecules like phthalate, diphenate, mellitate and trimellitate. These are examples of some possible molecules; there are many other polycarboxylates which can be used in the combination.
Cations: elements chosen from:
Group IIa—Magnesium, calcium, strontium, and barium
Group IIIb—Scandium, yttrium, lanthanum and the other lanthanides like cerium, praseodymium, neodymium, samarium, europium, gadolinium, etc.
Group IVb—Titanium and zirconium
Group Vb—Vanadium and niobium
Group VIb—Chromium and molybdenum
Group VIIb—Manganese
Group VIII—Iron, cobalt and nickel
Group Ib—Copper
Group IIb—Zinc
Group IIIa—Aluminum
Group Va—Bismuth
Lithium phosphate: From the CRC Handbook of Chemistry and Physics, 65$^{th}$ Edition, the solubility of lithium phosphate in water is approximately 0.04 grams per 100 milliliters, making it an ideal candidate to add to corrosion-resistant primers. This level of solubility is enough to dissolve into corrosive electrolyte and provide corrosion inhibition but not so high that it dissolves too quickly and is rapidly depleted from the primer or causes coating damage like osmotic blistering. The vast majority of other lithium compounds are too water soluble for practical use in corrosion inhibiting coatings. The opposite is true for phosphate compounds. Most are far too insoluble for use and they essentially never dissolve out of the coating. These are two properties one can take advantage of with lithium phosphate as it dissolves in water.

The choice of cation and anion for the polycarboxylic compound will influence water and organic solvent solubility which needs to be considered for the application of interest. FIGS. 8 and 9 show examples of water solubility and solubility products for some combinations of cations and anions. As the tables show, lithium compounds have relatively high solubility. Inhibitors may be blended using the same cation, for example zinc citrate and zinc oxalate, or they may be blended with different cations with the same or different anions, for example magnesium oxalate and zinc oxalate.

Inhibitors may be blended with different molar ratios to obtain the maximum synergistic performance for a particular application. Inhibitors may also be used at varying concentrations in the particular vehicle for the application. This may range from relatively low concentrations of weight percent up to very high concentrations of 20 to 30 weight percent, similar to the amounts of chromate inhibitors are used today in corrosion-inhibiting epoxy primers.

Inhibitors may be combined in bulk after synthesis, or they may be blended during synthesis. For example, additional or different synergistic effects may be garnered by reacting oxalic acid with zinc nitrate and magnesium nitrate to achieve a compound with a mixed complex of zinc and magnesium oxalate. The solubility and corrosion-inhibiting properties of this compound may be different than the combination of separately synthesized zinc oxalate and magnesium oxalate compounds.

These inhibitor blends may be used directly in water-based systems, added to protective coatings, or any other application where metals need protection from corrosion.

Composition Examples and Performance Data

1. Lithium phosphate, zinc oxalate, zinc citrate as well as combinations of lithium phosphate and zinc oxalate, lithium phosphate and zinc citrate, and lithium phosphate and zinc oxalate and zinc citrate were added to 3.5% salt water at their solubility limit (saturation) and assessed electrochemically using 2024-T3 aluminum to determine their ability to inhibit the corrosion of 2024-T3 compared to no inhibitors.

FIG. 10 shows specific cathodic data from these curves, as well as for strontium chromate, historically one of our best corrosion inhibitors, at Ecorr, the inflection point where corrosion would occur absent external applied voltage. Not only does it show that the zinc citrate and lithium phosphate by themselves increase current density, it's clear that the combination of three inhibitors is far superior to the individual inhibitors but still not as good as strontium chromate.

2. Lithium phosphate was assessed in aluminum-rich primer in combination with magnesium oxalate, zinc oxalate, zinc citrate and in combination with a blend of magnesium oxalate and zinc oxalate. The polycarboxylates were also assessed in the aluminum-rich primer without the lithium phosphate, to elucidate its effect.

Table 1 details the weight percent of each inhibitor and metal powder loading for each composition. Primers used a two-component amine-cured epoxy resin system and appropriate solvents.

TABLE 1

Compositions of aluminum-rich primers with polycarboxylates, with and without lithium phosphate.

| Composition | Metal powder (wt %) | Magnesium oxalate (wt %) | Zinc oxalate (wt %) | Zinc citrate (wt %) | Lithium phosphate (wt %) |
|---|---|---|---|---|---|
| 1 | 56.22 | | | | |
| 2 | 55.20 | 1.82 | | | |
| 3 | 54.92 | | 2.31 | | |
| 4 | 52.46 | | | 6.70 | |
| 5 | 54.43 | 1.80 | | | 1.40 |
| 6 | 54.16 | | 2.28 | | 1.40 |
| 7 | 51.76 | | | 6.61 | 1.33 |
| 8 | 53.94 | 1.78 | 2.27 | | |
| 9 | 53.21 | 1.76 | 2.24 | | 1.37 |

Figure 5:
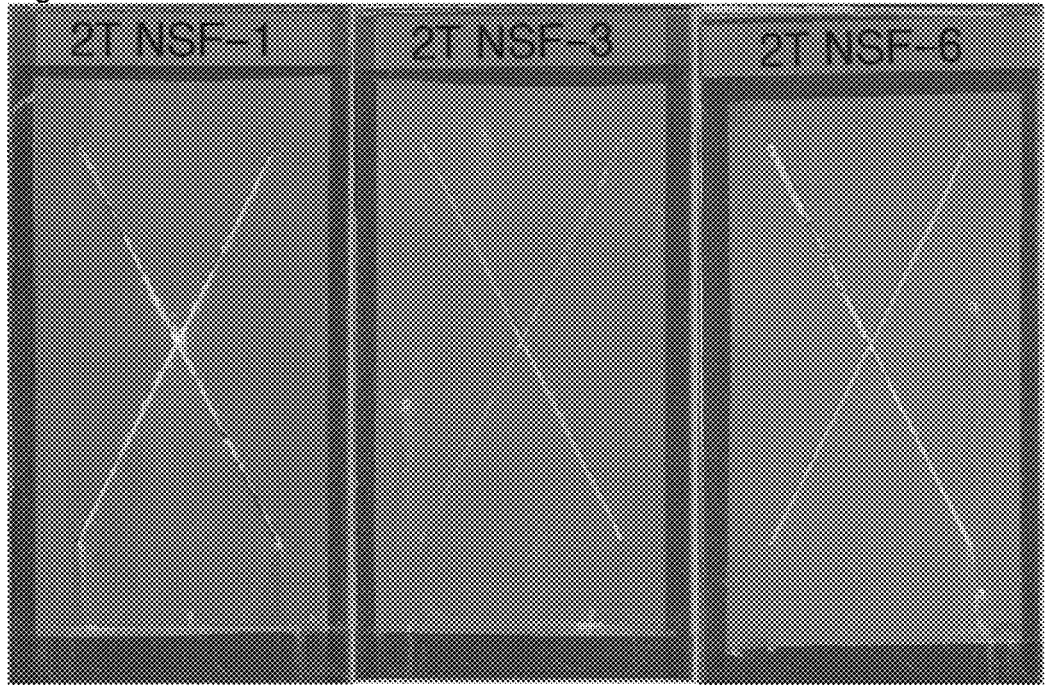
FIG. 5. Performance of aluminum-rich primers with and without lithium phosphate after 2000 hours in ASTM 8117 salt fog. Panel 1 is the aluminum-rich primer control (Composition 1) panel 3 contains zinc oxalate (Composition 3) and panel 6 contains zinc oxalate and lithium phosphate (Composition 6).
Figure 6:
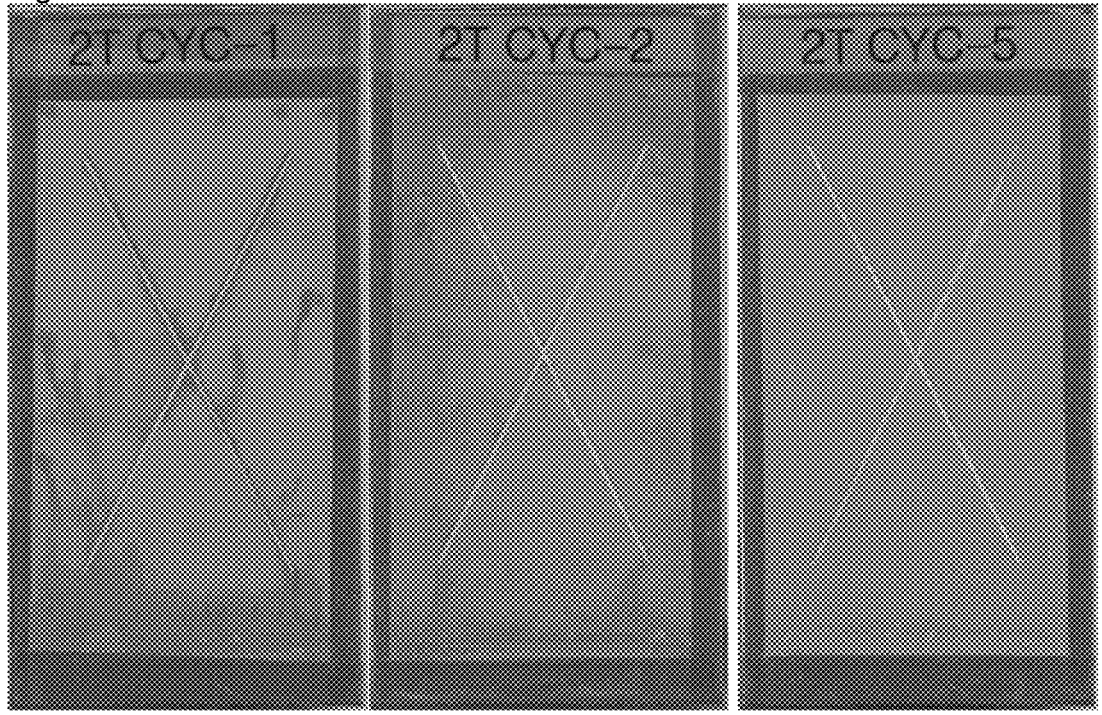
FIG. 6. Performance of aluminum-rich primers with and without lithium phosphate after 83 cycles/days (2000 hours) in GMW 14872 cyclic corrosion exposure. Panel 1 is the aluminum-rich primer control (Composition 1), panel 2 contains magnesium oxalate (Composition 2) and panel 5 contains magnesium oxalate and lithium phosphate (Composition 5).

FIGS. 5 and 6 show selected examples of the performance of these primers after 2000 hours in ASTM 8117 neutral salt fog or 83 cycles (days) in GMW 14872 cyclic corrosion chambers.

3. Lithium phosphate was assessed in aluminum-rich primer in combination with zinc oxalate and magnesium oxalate, which is one of the leading performing inhibitor combinations. FIG. 7 shows the performance of this primer (Composition 9), compared to no inhibitors (Composition 1) and the magnesium oxalate and zinc oxalate alone (Composition 8) after 21 cycles/days (504 hours) in GMW 14872 cyclic corrosion testing. Panels shown have 304 stainless steel washers and bolts and coatings removed to more effectively show the damage to the aluminum substrate and how well the various aluminum-rich primers inhibit galvanic corrosion.

A variety of metals such as steel, aluminum and metal alloys can be protected by using the synergistic compositions and methods of this invention. The present invention relates to coating the metals with compositions comprising the synergistic metal polycarboxylates and the lithium phosphate. The metals to be protected may be part of a structure made of a number of different parts which include different metals in contact with each other. At the point of contact of the different metals is the point of galvanic corrosion. The use of the synergistic polycarboxylic metal salts and a lithium phosphate of this invention in a binder or coating composition allows the corrosion-inhibiting compositions to be applied on substrates of different metals while improving the corrosion resistance of one metal without increasing the corrosion of a different metal component. The method comprises using a binder or coating on the metal which includes an effective amount of the synergistic polycarboxylic metal salts and lithium phosphate. The coatings can include organic systems such as a simple binder or an organic coating including paints and various other known metal inorganic or organic coatings.

Depending on the chemical composition of the coating or binder to be applied to the metal surface to inhibit corrosion, the coating e.g. a polymeric binder can range from about 50 to 99 percent by weight and the synergistic blend can range from about 1.0 to 50 percent by weight. The synergistic blend in the coating e.g. the binder consists essentially of 1.0 to 50 percent by weight of lithium phosphate and 50 to 99 percent by weight of at least one polycarboxylate compound.

The metal coatings include inorganic, polymeric or organic binders, such as paints, lubricants, oils, greases and the like. Suitable polyisocyanate polymers or prepolymers, include, for example, aliphatic polyisocyanate polymers, such as hexamethylene diisocyanate homopolymer ("HMDI") trimer, and aromatic polyisocyanate prepolymers, such as 4,4'-methylenediphenylisocyanate ("MDI") prepolymer and combinations of two or more aliphatic polyisocyanate prepolymers. A preferred binder for the synergistic composition comprises the polyurethanes, and more particularly the aliphatic polyurethanes derived from the reaction of polyols and multifunctional aliphatic isocyanates and the precursors of the urethanes. Preferred polyisocyanates include hexamethylene diiocyanate and methylene-bis-(4-cyclohexyl isocyanate) DESMODUR-N. By selecting the proper polyols and by adjusting the NCO to OH ratio, the physical properties and efficiency of the film such as the strength of film, flexibility and solvent resistance can be controlled. Other binders include the epoxy polymers or epoxy prepolymers, for example, any epoxy resin, including a multifunctional epoxy resin. Examples of epoxy resins comprise polyglycidyl ethers of pyrocatechol, resorcinol hydroquinone and 4,4'-dihydroxydiphenyl methane. Among the commercially available epoxy resins are polyglycidyl derivatives of phenolic compounds, such as the tradenames EPON 828, EPON 1001 and EPON 1031.

While this invention has been described by a number of specific examples, it is obvious that there are other variations and modifications which can be made without departing from the spirit and scope of the invention as particularly set forth in the appended claims.

The invention claimed is:

1. Synergistic corrosion-resistant inhibitor composition consisting essentially of combinations of at least one metal polycarboxylate and 1.0 to 50 percent by weight of the composition of lithium phosphate wherein the metal of the polycarboxylate is selected from the group consisting of Groups IIa, IIIb, IVb, Vb, VIb, VIII, Ib, IIb and IIIa of the Periodic Table.

2. Synergistic corrosion-resistant inhibitor composition of claim 1 consisting essentially of a combination of at least one metal polycarboxylate selected from Group IIa and IIIb at the Periodic Table and from about 1.0 to 50 percent by weight of the composition of lithium phosphate.

3. The synergistic composition of claim 1 wherein the metal polycarboxylate is a linear, branched or aliphatic molecule.

4. The synergistic composition of claim 1 wherein the metal polycarboxylate ranges from about 50 to 99 weight percent of the synergistic composition.

5. Synergistic corrosion-resistant inhibitor composition consisting essentially of combinations of at least one metal polycarboxylate and 1.0 to 50 percent by weight of the composition of lithium phosphate wherein the metal polycarboxylate is a blend of magnesium oxalate and zinc oxalate.

6. Synergistic corrosion-resistant inhibitor composition consisting essentially of a combination of at least one metal polycarboxylate and 1.0 to 50 percent by weight of the composition of lithium phosphate wherein the metal polycarboxylate is a blend of zinc citrate and zinc oxalate.

7. Synergistic corrosion-resistant inhibitor composition consisting essentially of a combination of at least one metal polycarboxylate and 1.0 to 50 percent by weight of the composition of lithium phosphate wherein the metal polycarboxylate is zinc oxalate.

8. Synergistic corrosion-resistant inhibitor composition consisting essentially of a combination of at least one metal polycarboxylate and 1.0 to 50 percent by weight of the composition of lithium phosphate wherein the metal polycarboxylate is zinc citrate.

9. The process for improving metals resistance to corrosion which comprises coating said metals with a sufficient amount of binder which contains a synergistic blend of a metal polycarboxylate and lithium phosphate wherein the binder is paint.

10. A process for improving metals resistance to corrosion which comprises coating said metals with a sufficient amount of binder containing a synergistic blend of a metal polycarboxylate and from about 1.0 to 50 percent of the synergistic blend of lithium phosphate.

11. The process of claim 10 wherein the binder is an epoxy polymer.

12. The process of claim 10 wherein the binder is a polyurethane.

13. The process of claim 10 wherein the binder is a lubricant.

* * * * *